United States Patent
Lowe et al.

(10) Patent No.: US 7,668,986 B2
(45) Date of Patent: Feb. 23, 2010

(54) INSTALLING DRIVERS

(75) Inventors: Chris Lowe, Cambridgeshire (GB); James Digby Yarlet Collier, Cambridgeshire (GB)

(73) Assignee: Cambridge Silicon Radio Limited, Cambridge (GB)

( * ) Notice: Subject to any disclaimer, the term of this patent is extended or adjusted under 35 U.S.C. 154(b) by 181 days.

(21) Appl. No.: 11/817,052

(22) PCT Filed: Feb. 13, 2006

(86) PCT No.: PCT/GB2006/000485

§ 371 (c)(1),
(2), (4) Date: Oct. 3, 2007

(87) PCT Pub. No.: WO2006/092552

PCT Pub. Date: Sep. 8, 2006

(65) Prior Publication Data

US 2008/0195768 A1    Aug. 14, 2008

(30) Foreign Application Priority Data

Mar. 4, 2005    (GB) .................................. 0504567.9

(51) Int. Cl.
G06F 13/12    (2006.01)
G06F 13/00    (2006.01)

(52) U.S. Cl. ............................... 710/62; 710/72; 710/2; 710/313; 710/105; 719/321

(58) Field of Classification Search ................... 710/2, 710/62–64, 72–74, 105–106, 313; 719/320–321, 719/326–327
See application file for complete search history.

(56) References Cited

U.S. PATENT DOCUMENTS

| | | | |
|---|---|---|---|
| 5,457,785 A * | 10/1995 | Kikinis et al. ............... 710/307 |
| 6,009,480 A | 12/1999 | Pleso et al. | |
| 6,493,770 B1 * | 12/2002 | Sartore et al. .................. 710/8 |
| 6,574,588 B1 | 6/2003 | Shapiro et al. | |
| 7,275,118 B2 * | 9/2007 | Ytterstrom ..................... 710/8 |
| 2005/0262271 A1 * | 11/2005 | Ytterstrom ..................... 710/8 |

* cited by examiner

Primary Examiner—Christopher B Shin
(74) Attorney, Agent, or Firm—Novak Druce DeLuca + Quigg LLP

(57) ABSTRACT

A peripheral device having: an interface for connection to a host device; a memory for storing software for use by the host device for operating with the peripheral device; and a processor for controlling the operation of the device such that the device has two operating modes over the interface: a first mode in which it operates as a storage device storing the said software and a second mode in which it operates as a device for providing other functionality to a device connected to it via the interface by means of the software; the peripheral device being configured so that on connection of the interface to a host device it operates in the first mode and so that it subsequently operates in the second mode.

14 Claims, 2 Drawing Sheets

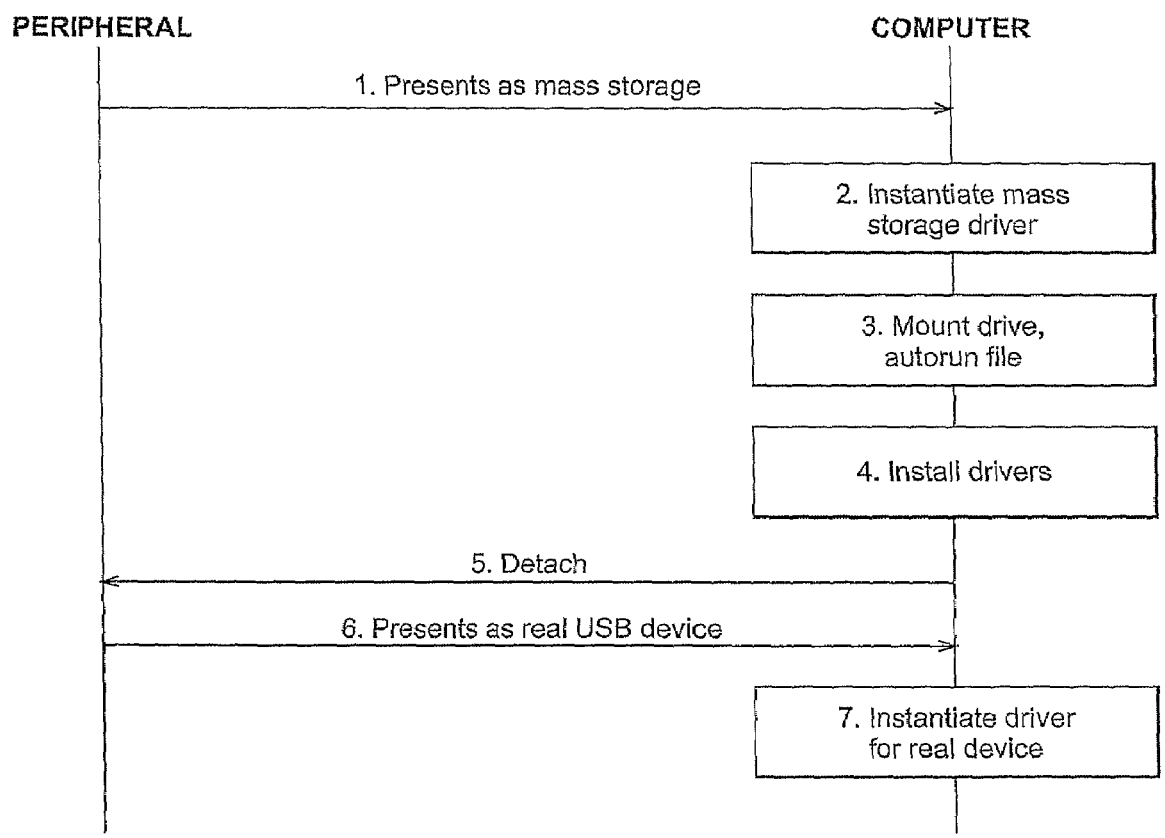

INSTALLING DRIVERS

This invention relates to installing drivers for peripheral devices.

When a device is connected to a computer, the computer may need to use driver software to communicate with the device. The driver software runs on the computer and provides the means for the computer to transfer data to and from the device and to activate functions of the device. For example, the driver software may provide a library of procedures that can be called by processes running on the computer in order to have the device carry out a function. The procedures can receive parameters from the calling process and form suitable signals for communication to the device to have it to carry out the function.

In order for the driver software to be used on the computer it must first be installed on the computer. Typically this involves storing the driver software on non-volatile storage accessible to the computer, for example the computer's hard disc drive, and registering the driver software so that the computer knows that it is available and is to be used for communications with the device.

Installing driver software can be complex and can call for computing knowledge, making it a difficult task for unskilled people. Therefore, in making a peripheral device easy to use, it is important to make its driver software easy to install.

The device driver is usually installed around the time the hardware peripheral device is first attached to the computer—either before or after, depending on the precise installation procedures recommended by the manufacturer to ensure that the driver installs cleanly. The driver is usually supplied on a CD or other disc that is sold with the peripheral device in question, or it could be downloaded from the internet. This approach to delivering the driver has the drawback that the hardware itself is not self-contained, as drivers need to be supplied through an additional medium.

One approach to making driver software easy to install is to have the computer download the driver software automatically from a central source. This approach is available in operating systems such as Microsoft Windows XP. When the peripheral device is attached to the computer it provides the computer with its identity. The computer then contacts a server via the internet and attempts to locate a suitable driver for that device. If a suitable driver is located then the computer downloads and registers it. This approach has a number of disadvantages. First, it only works if the server is correctly configured with the appropriate drivers. Second, it only works if the computer has access to the central server; thus if the computer is not connected to a network then it cannot access the drivers. Third, users may have concerns over security if they are to download the drivers from a source they had not themselves specified.

Operating systems typically support some standard interface protocols and drivers for communicating with peripheral devices of standard types. For example, operating systems can typically support a standard protocol for communicating with a mass storage device such as a disc drive over a USB interface. However, standard protocols are not generally suitable for communicating with non-standard devices.

One approach for improving the installation of drivers is to use a USB composite device. This is outlined in WO 2004/038584. This approach has several disadvantages, most significantly a race condition between the USB manifestations of the mass storage device and of the custom USB device. This approach also leaves an additional drive installed on the host computer, which may be confusing to users.

Similar issues to those that apply to drivers apply also to the installation of executable files that are needed or are useful for interaction with a peripheral device.

There is a need for an improved means of installing drivers and/or executable files for interacting with a peripheral device.

According to one aspect of the present invention there is provided a peripheral device having: an interface for connection to a host device; a memory for storing software for use by the host device for operating with the peripheral device; and a processor for controlling the operation of the device such that the device is capable of operating in either of two operating modes over the interface: a first mode in which it operates as a storage device storing the said software and a second mode in which it operates as a device for providing other functionality to a device connected to it via the interface by means of the software; the peripheral device being configured so that on connection of the interface to a host device it operates in the first mode and so that it subsequently operates in the second mode.

Preferably the software includes a driver for enabling a host device to communicate with the peripheral device when it is operating in the second mode.

Preferably the software includes an executable program for causing a host device to install the driver.

Preferably the executable program is configured to cause a host device to, after installing the driver, send a message of a predetermined type to the peripheral device, the peripheral device being responsive to such a message to switch from operation in the first mode to operation in the second mode.

Preferably the software includes an application for processing data received by the peripheral device when it is operating in the second mode.

Preferably the software includes an application for transferring data to the peripheral device when it is operating in the second mode.

Preferably the software includes data for causing a host device to, on detection of the peripheral device as a storage device, automatically execute code comprised in the software.

Preferably the said code is capable of detecting whether the host device has installed on it a driver for enabling a host device to communicate with the peripheral device when it is operating in the second mode, and is arranged to: if no such driver is detected, cause the driver stored by the peripheral device to be installed on the host device; and if such a driver is detected, trigger the peripheral device to operate in the second mode.

Preferably the peripheral device is arranged to, in the first mode, operate as a standard storage device with which a host device can communicate using a standard driver.

Preferably the peripheral device is arranged to, in the first mode, operate as a custom storage device with which a host device can communicate using a standard driver.

Preferably the software includes a driver for enabling a host device to communicate with the peripheral device in the first mode, the driver being configured to cause the host device to switch from operation in the first mode to operation in the second mode.

Preferably the device is arranged to, on connection of the interface to a host device, transmit an identity indicating the manner in which the device is operating whereby the host device can determine which driver to use for communication with the device.

Preferably the interface is a universal serial bus (USB) interface.

An aspect of the invention also provides a peripheral device as claimed in any preceding claim and the host device.

The present invention will now be described by way of example with reference to the accompanying drawing.

In the drawing:

FIG. 2 shows communication for driver installation.

Figure 1:
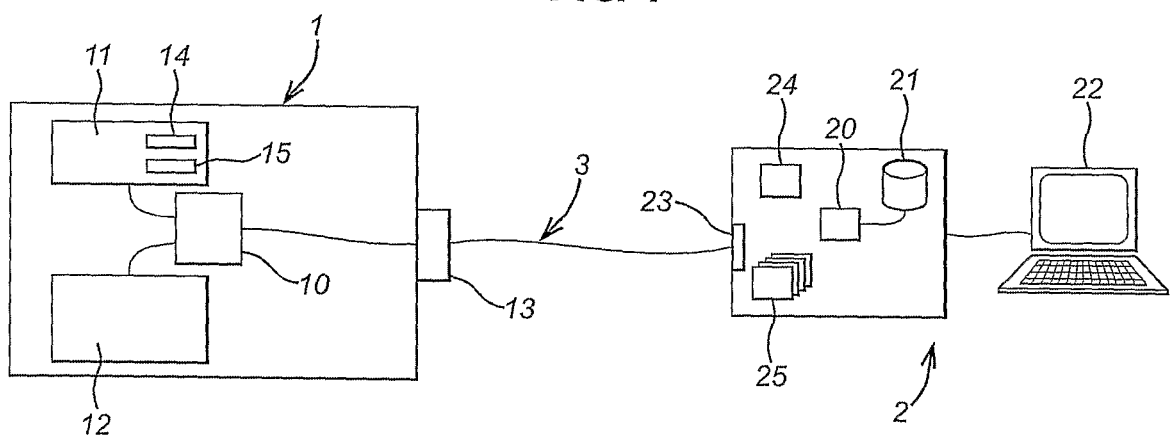
FIG. 1 shows schematically a computer and a peripheral device.

The peripheral device 1 of FIG. 1 is configured to be capable of presenting itself to the host computer 2 in either of two ways. When it is first connected to the computer it presents itself as a storage device suitable for communication with the computer by means of standard drivers that are built into the operating system 3 of the computer. When presenting itself as a storage device it gives the computer access to driver software for use with the device. When the computer has received and preferably installed that driver software the peripheral device presents itself to the computer as a non-standard USB device with which the computer can communicate by means of the driver software provided by the device.

In comparison to the prior art this approach has the advantages that the drivers can be installed without the need for a supplementary CD or other disc to store the driver; that they can be installed with little or no need for intervention by the user; and that they can be installed without security concerns since they do not need to be downloaded from a remote location. The same principle can be applied to the installation of application software for operation with the device.

FIG. 1 shows a peripheral device 1 and a computer 2 connected by an interface 3. The peripheral device could be any kind of peripheral; examples include keyboards, mice and sound cards. The computer 2 could be a personal computer or could be a device that incorporates computer functionality such as a games console, a set-top box, a toy, a domestic appliance or a car. The interface could be a USB interface, a PCI interface or another sort of interface.

The peripheral device 1 comprises a processor 10, a non-volatile memory 11, a functional subsystem 12 and an interface connector 13. The non-volatile memory 11 stores data including program code 14 for execution by the processor 10 and driver software 15 for uploading to a computer that is to communicate with the peripheral device. The program code defines the functionality of the device for communication with an attached computer. The non-volatile memory could be implemented on an integrated circuit. The functional subsystem 12 provides the specific functionality of the device; it could, for example, be the keys and switches of a keyboard or the sound generation components of a sound card. The peripheral device could receive its electrical power from the computer via interface 3, or it could have its own mains or battery power supply.

The computer 2 has a processor 20, a non-volatile memory 21, a user interface 22 and a device interface connector 23. The computer supports an operating system 24 and a number of application programs 25. The non-volatile memory 21 could be implemented as a hard disc. The non-volatile memory 21 stores program code that defines the operating system and the application programs, which are executed by the processor 20. The user interface 22 provides a means for a user to interact with the computer. The device interface connector 23 allows peripheral devices such as device 1 to be connected to the computer 2 for communication with it.

In the present example the interface 3 is a USB interface. The interface connectors 13 and 23 are USB-type connectors which are interconnected by a cable 4. Alternatively they could be connected directly together.

The normal procedure for instantiation of a USB driver on a host device is as follows:

1. A USB device is connected to and appears on the USB bus.

2. A specific driver for the USB bus itself then queries the USB device for the device class and the VID (vendor identifier)+PID (product identifier).

3. The operating system of the host device looks through the drivers available to it for a driver that is indicated as being suitable for serving the detected VID and PID pair. If it finds one, it goes to step 5.

4. The operating system looks through the drivers available to it for a driver that is indicated as being suitable for serving the detected device class. If it finds no such device then it fails to instantiate any driver.

5. The operating system instantiates the appropriate device driver as found in step 3 or 4.

6. The USB device and the host device communicate with each other by means of the instantiated driver.

The way in which the peripheral device 1 and the computer 2 are configured to operate will now be described. This configuration is by virtue of the design of the software stored in memories 11 and 21 for execution by processors 10 and 20. The steps in the operation are illustrated in FIG. 2.

1. When the peripheral device is first connected to the computer it presents itself as a USB mass storage device. It does this by presenting itself as having a device class corresponding to that of a mass storage device when the USB data connection between it and the computer is initialised.

2. The operating system of the computer detects the connection of a USB mass storage device. This causes the operating system to instantiate the generic device driver for USB mass storage devices in order to communicate with the device. Such drivers are typically built into operating systems. The operating system of the computer then maps the drive presented by the peripheral device on to the computer's file system. If the operating system were not to support the automatic mapping of the drive then equivalent functionality could be provided by a program running on the operating system and monitoring newly attached devices acting as storage drives.

3. The mapping of the drive on to the file system triggers the operations normally performed by the operating system for a newly mounted drive. Provided the operating system is configured to do so, these actions will include checking the drive for the presence of a designated file that is to be executed on a new mounting of a drive. In the example of Microsoft Windows operating systems this is an autorun.inf file. The operating system may need to be configured to run the designated file automatically. For security it could be desirable for the file to be run automatically only after a user has confirmed to the computer that he approves of it doing so. If the operating system were not to support the automatic running of the file then equivalent functionality could be provided by a program running on the operating system and monitoring newly attached drives.

4. The file structure presented by the peripheral device, under the control of the information stored in memory 11, includes such a designated file (e.g. autorun.inf) and also an executable file which constitutes a program suitable for execution by processor 20 to install drivers for the specific functionality of the peripheral device. In the case of the Windows operating system that executable file could be called setup.exe. The designated file (e.g. autorun.inf) is configured to cause the operating system to load and execute the executable file. Therefore, when the operating system of the computer 2 reads and executes the designated file it will be caused to load the executable file (e.g. by copying it from the peripheral device to local memory on the computer 2) and execute it. The executable file is then executed and causes a driver for supporting the specific functionality of the peripheral device to be installed on the computer. In the case of the Windows operating system this may be by the copying or creation on the hard disc of the computer of the device driver's .sys files and sundries.

5. The executable file includes code that, after the driver has been installed, sends a command to the peripheral device to inform it that the driver has been installed. This may be a conventional "detach" command. The executable may then terminate, or it may continue running to support step 7 below.

6. In response to that command the peripheral device disconnects from the computer and then automatically reconnects, this time presenting itself to the computer as the real USB device for providing its specific functionality: no longer a generic USB mass storage device. The peripheral device is pre-programmed by means of the code stored in its memory 11 to do that in response to the command. The device class or identifier of the real USB device as which it presents itself is such as to correspond to the newly installed driver. Instead of requiring a command to be received from the computer in order to trigger disconnection, the peripheral device could do this step automatically. For example, it could perform the step a predetermined period of time after having connected to the host computer, or it could perform the step a predetermined period of time after the executable file (or another file involved in the installation) has been requested by and provided to the computer. In these cases, step 5 above could be omitted. The predetermined period of time should be selected to be sufficient to provide confidence that the executable file would have completed execution, if necessary.

7. The operating system of the computer detects the connection of a new USB device, and based on the class of the device selects a driver for use with the device. That is the newly installed driver, since it includes data that identifies it as being suitable for operation with devices of that class. This selection could be performed by the operating system. Alternatively, if the executable has not terminated then it could select and/or start using the driver. The specific functionality of the device can then be used by the computer 2 and its user.

When the device is removed from the computer the executable—if it is still running—could remove itself from storage on the computer. It could also uninstall the drivers, but that would not normally be desirable because the drivers would not normally occupy much storage on the computer.

Normally, in order to load the executable file the computer would copy the file from the peripheral device into temporary memory 26 on the computer. If the executable file is large, or it requires a large amount of other data also to be loaded in order to support its operation then the transfer of the data from the peripheral device to the computer may take some time. The following technique may be used to reduce this delay. The executable may be configured so as also to install a custom mass storage device driver. This device driver is arranged so as to be used by the operating system for communication with the mass storage device presented by the peripheral device in preference to the default mass storage device driver. This may be achieved by virtue of the device's identity being provided by the device to the computer when the device presents itself to the computer. In the case of a USB device this identity could be its VID and PID. The custom mass storage driver is arranged to, on initial communication with the device, send a command or a command string of a predetermined type to the peripheral device. The peripheral device is configured to, in response to such command(s), automatically disconnect from the computer and re-present itself as the real USB device for providing its specific functionality. In this way, the loading of the executable for a second time can, if desired, be avoided. Using a device driver is in many case quicker than using an executable.

Another technique is to provide two executable files from the peripheral device. The first, which is called from the autorun.ini or other autoloader file, is a small file that, when executed by the computer checks whether the appropriate driver for the specific manifestation of the USB device is installed. If they are then it signals the USB device with a command as in step 5 above and then terminates. If they are not then it causes the computer to load the second, larger executable from the USB device so as to install the driver.

In practice the non-volatile memory could store multiple sets of driver software, each for use with a different operating system or version of operating system and a number of autoloader files. The computer would install the appropriate version as is normal for driver installation from a conventional common source such as a compact disc (CD).

The executable file could provide functions other than simply overseeing the installation of drivers for the attached device. It could provide functions for processing and/or displaying data received by the computer from the device. It could provide functions for capturing data and directing it to the device.

One example of a device that could operate as described above is a USB dongle that provides a means for streaming video. Such a dongle could contain an application to copy the streaming video content, either from the display screen or from a stored or incoming video stream. That application could be loaded on the computer in the manner described above and could then operate to send the stream of video data over the transport provided by the specific functionality of the specialised video device portion of the dongle.

Another example of a device that could operate as described above is a USB thermometer. The thermometer could be a USB device, and could store an application for displaying data provided from the USB thermometer in a graphical form. When the thermometer is inserted into a computer the application is loaded (if necessary) and executed using the techniques described above. It can then receive climate data from measuring devices in the USB endpoint unit and present them graphically to a user.

Another example of a device that could operate as described above is a USB joystick having functions that go beyond those of a joystick supported by standard drivers: for example additional switch controls. The user would plug the joystick into a computer and drivers stored by the joystick that accommodate the specialised functionality would be installed from storage on the joystick.

Another example of a device that could operate as described above is a USB mouse. The user would plugs the mouse into the computer, and the device drivers for the mouse would be loaded prior to the mouse manifesting on the USB bus. The mouse should preferably be configured so that it manifests without the mass storage device after it has been initialised, so that the mouse can be used by the computer when the computer's BIOS alone is operating.

The present invention is not limited to use with the USB interface. It could be used with other interfaces that support the necessary functionality: for example the presentation of devices of different types and the presentation of a device in a manner that allows an executable to be run directly from it. Such interfaces include SDIO, IEEE 1394 (a.k.a. FireWire, i.Link) and CardBus, The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A peripheral device having:
    an interface for connection to a host device;
    a memory for storing software for use by the host device for operating with the peripheral device, the software including: a driver for enabling a host device to communicate with the peripheral device when the peripheral device is operating in a second mode, an executable program for causing a host device to install the driver, and data for causing the host device to on detection of the peripheral device as a storage device, automatically execute code comprised in the software; and
    a processor for controlling the peripheral device such that the device is capable of operating in either of two operating modes over the interface: a first mode in which it operates as a storage device storing the said software and the second mode in which it operates as a device for providing other functionality to a device connected to it via the interface by means of the software;
    the peripheral device being configured so that on connection of the interface to a host device it operates in the first mode and so that it subsequently operates in the second mode.

2. A peripheral device as claimed in claim 1, wherein the executable program is configured to cause a host device to, after installing the driver, send a message of a predetermined type to the peripheral device, the peripheral device being responsive to such a message to switch from operation in the first mode to operation in the second mode.

3. A peripheral device as claimed in claim 1, wherein the software includes an application for processing data received by the peripheral device when it is operating in the second mode.

4. A peripheral device as claimed in claim 1, wherein the software includes an application for transferring data to the peripheral device when it is operating in the second mode.

5. A peripheral device as claimed in claim 1, wherein the code is capable of detecting whether the host device has installed on it a driver for enabling a host device to communicate with the peripheral device when it is operating in the second mode, and is arranged to:

if no such driver is detected, cause the driver stored by the peripheral device to be installed on the host device; and
if such a driver is detected, trigger the peripheral device to operate in the second mode.

6. A peripheral device as claimed in claim 5, wherein the peripheral device is arranged to, in the first mode, operate as a standard storage device with which a host device can communicate using a standard driver.

7. A peripheral device as claimed in claim 5, wherein the peripheral device is arranged to, in the first mode, operate as a custom storage device with which a host device can communicate using a standard driver.

8. A peripheral device as claimed in claim 7, wherein the software includes a driver for enabling a host device to communicate with the peripheral device in the first mode, the driver being configured to cause the host device to switch from operation in the first mode to operation in the second mode.

9. A peripheral device as claimed in claim 1, wherein the device is arranged to, on connection of the interface to a host, transmit an identity indicating the manner in which the device is operating whereby the host device can determine which driver to use for communication with the device.

10. A peripheral device as claimed in claim 1, wherein the interface is a universal serial bus (USB) interface.

11. A peripheral device as claimed in claim 1, wherein the interface is a Secure Digital In put Output (SDIO) interface.

12. A peripheral device as claimed in claim 1, wherein the interface is a CardBus interface.

13. A peripheral device as claimed in claim 1, wherein the interface is a 1394 interface.

14. A method for installing a driver for enabling a host device to communicate with a peripheral device connected to the host device via an interface, the peripheral device being capable of operating in either of two operating modes over the interface: a first mode in which it operates as a storage device storing software and a second mode in which it operates as a device providing other functionality to a device connected to it via the interface by means of the software, the method comprising:
    operating the peripheral device in the first operating mode;
    determining in the host device that the peripheral device is a storage device and, responsive to that determination, communicating with the peripheral device using a standard driver;
    reading at the host device software stored in the peripheral device, the software including: a driver for enabling the host device to communicate with the peripheral device when it is operating in the second mode, an executable program for causing the host device to install the driver, and data for causing the host device to, on detection of the peripheral device as a storage device, automatically execute code comprised in the software;
    installing the driver at the host device and sending a message of predetermined type from the host device to the peripheral device;
    switching the peripheral device from operating in the first mode to operating in the second mode responsive to the message of predetermined type.

* * * * *